US006671952B2

(12) United States Patent
Ono

(10) Patent No.: US 6,671,952 B2
(45) Date of Patent: Jan. 6, 2004

(54) METHOD OF LEAD WIRE CONNECTION

(75) Inventor: Kazuyasu Ono, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 0 days.

(21) Appl. No.: 10/080,680

(22) Filed: Feb. 25, 2002

(65) Prior Publication Data

US 2002/0117327 A1 Aug. 29, 2002

(30) Foreign Application Priority Data

Feb. 28, 2001 (JP) .................................... P. 2001-055107

(51) Int. Cl.$^{7}$ ......................... H01R 43/02; B23K 11/24

(52) U.S. Cl. ............................. 29/860; 29/830; 29/832; 29/840; 29/843; 219/110; 219/56.21; 219/56.22

(58) Field of Search .......................... 29/868, 830, 832, 29/840, 842, 843, 854, 860, 861, 859, DIG. 48; 219/56.21, 56.22, 92, 110

(56) References Cited

U.S. PATENT DOCUMENTS

| | | | | | |
|---|---|---|---|---|---|
| 3,538,293 | A | * | 11/1970 | Procacino | 219/86.41 |
| 5,308,948 | A | * | 5/1994 | Kawagoe et al. | 219/110 |
| 5,800,663 | A | * | 9/1998 | Imahori et al. | 156/304.1 |
| 5,866,868 | A | * | 2/1999 | Hirane | 219/110 |
| 6,125,533 | A | * | 10/2000 | Warner et al. | 29/868 |

* cited by examiner

*Primary Examiner*—A. Dexter Tugbang
*Assistant Examiner*—Tai Nguyen
(74) *Attorney, Agent, or Firm*—Sughrue Mion, PLLC

(57) ABSTRACT

A method of lead wire connection includes mounting a lead wire onto an uppre surface of a land portion, supplying a cover member onto the lead wire, pressing the lead wire via the cover member against the upper surface of the land portion by a first electrode tool, heating the first electrode tool to expose a part of the lead wire, and applying an electric current between the first electrode and a second electrode tool so that resistance welding is effected between the cover member and the lead wire and between the lead wire and the land portion.

5 Claims, 4 Drawing Sheets

METHOD OF LEAD WIRE CONNECTION

BACKGROUND OF THE INVENTION

1. Field of the Invention

The present invention relates to a structure and a method for connecting a coated lead wire with a land portion, and a clad material adapted for lead wire connection.

2. Description of the Related Art

In JP-A-9-84191, a process of removing an insulating coating of a conductor wire is carried out independently of a process of connecting the wire with an electrically conductive adhesive agent. In JP-A-9-84192, a process of removing an insulating coating of a conductor wire is carried out independently of soldering. In JP-A-9-200895, a land portion to which a coil terminal is to be connected has a substantially circular shape to prevent occurrence of a defect in connection due to a solder splitting phenomenon.

In soldering connection, the improvements as described above are needed to prevent occurrence of a defect in connection. As a result, the shape of the land portion is restricted. Especially, a coil terminal connectable region is limited in a very small component such as an electroacoustic transducer. Accordingly, the restriction of the shape of the land portion results in that the degree of freedom in product design is limited.

As a recent measure against environmental problems, it is desired that elements which may have a possibility to give a bad influence to an environment are refrained from being used to the utmost in production of electronic components, circuit boards, electronic equipment, and the like. Especially, soldering is a popular method for electrically connecting conductors. If electronic equipment is illegally dumped, lead contained in solder might be eluted and adversely affect the environment.

It is considered to use lead free soldering as a measure against the environment problems. However, such a lead-free soldering has a higher melting point in temperature than any one of the methods in the conventional art. Accordingly, the component material must be high in heat-resistance and the producing cost thereof increases.

SUMMARY OF THE INVENTION

An object of the present invention is to provide a structure and a method of lead wire connection in which electric connection can be performed surely between conductors without using any solder, and to provide a clad material adapted for lead wire connection.

According to an aspect of the present invention, there is provided a structure of lead wire connection comprising:

- a lead wire covered with an electrical insulating coating;
- a land portion electrically connected to the lead wire; and
- a cover member disposed in opposition to the land portion with the lead wire held between the land portion and the cover member;
- wherein the cover member and the lead wire are electrically connected by resistance welding; and
- the lead wire and the land portion are also electrically connected by resistance welding.

According to the present invention, since resistance welding is carried out in a condition that the cover member is disposed on the lead wire, an electrode tool for resistance welding does not come into direct contact with the lead wire. Accordingly, it is possible to prevent damage or disconnection of the lead wire from occurring. Even if the lead wire is extra fine, electrical connection can be carried out surely.

Further, since the cover member is interposed between the lead wire and the electrode tool, the pressing force of the electrode tool can be set to a high value so that the contact area between the cover member and the lead wire and the contact area between the lead wire and the land portion increase. As a result, the welding area becomes large and reduction in the connection resistance can be attained.

Further, conductors can be electrically connected surely to each other without using any solder. Accordingly, a bad influence on the environment due to the elements composing the solder can be eliminated.

Further, a liquid binder such as solder becomes unnecessary. Accordingly, regardless the shape of the land portion, no defect in connection due to a solder splitting phenomenon is generated. As a result, the degree of freedom in design of shape of the land portion is improved greatly.

Further, according to the present invention, there is provided a method of lead wire connection comprising:

- mounting a lead wire covered with an electrical insulating coating onto an upper surface of a land portion;
- supplying a cover member onto the lead wire;
- pressing the lead wire via the cover member against the upper surface of the land portion by a first electrode tool having a heater mechanism while supporting a lower surface of the land portion by a second electrode tool;
- heating the first electrode tool by the heater mechanism to make the lead wire exposed partially; and
- applying an electric current between the first and second electrode tools so that resistance welding is effected between the cover member and the lead wire and between the lead wire and the land portion.

According to the present invention, if the heater mechanism is operated in a condition that the cover member, the lead wire, and the land portion are held between the first and second electrode tools, the coating of the lead wire is partially removed by heat to thereby make the lead wire exposed. In this condition, the electric contact of the first electrode tool with the cover member, the lead wire, and land portion is attained. Next, when an current is applied between the first and second electrode tools, much Joule heat is generated in a contact portion where the electric resistance is high so that the cover member and the lead wire are subjected to resistance welding, and the lead wire and the land portion are also subjected to resistance welding.

Since resistance welding is performed in a condition that the cover member is disposed on the lead wire, the electrode tool for resistance welding does not come into direct contact with the lead wire so that the lead wire can be prevented from being damaged or disconnected. Accordingly, even if the lead wire is extra fine, it is possible to realize the electric connection surely.

Further, since the cover member is interposed between the lead wire and the electrode tool, the pressing force of the electrode tool can be set to a high value so that the contact area between the cover member and the lead wire and the contact area between the lead wire and the land portion increase. As a result, the welding area becomes large and reduction in the connection resistance can be attained.

Further, conductors can be electrically connected surely to each other without using any solder. Accordingly, a bad influence on the environment due to the elements composing the solder can be eliminated. Further, a defect in connection due to a solder splitting phenomenon can be eliminated so that the degree of freedom in design of shape of the land portion is improved greatly.

Further, according to the present invention, there is provided a method of lead wire connection comprising:

mounting a lead wire covered with an electrical insulating coating onto an upper surface of a land portion;

supplying a cover member onto the lead wire;

pressing the lead wire via the cover member against the upper surface of the land portion by a pressure welding tool having a heater mechanism; and heating the pressure welding tool by the heater mechanism to make the lead wire exposed partially, and to supply a melted portion of the cover member around the lead wire and the land portion.

According to the present invention, when the heater mechanism is operated in a condition that the cover member, the lead wire, and the land portion are pressed by the pressure welding tool, the coating of the lead wire is partially removed by heat to thereby make the lead wire exposed. In this condition, as the temperature of the pressure welding tool becomes high, the cover member is partially melted and the melted material is supplied to the connection portion between the lead wire and the land portion.

Since thermal welding is performed in a condition that the cover member is disposed on the lead wire, the pressure welding tool does not come into direct contact with the lead wire so that the lead wire can be prevented from being damaged or disconnected. Accordingly, even if the lead wire is extra fine, it is possible to realize the electric connection surely.

Further, since the cover member is interposed between the lead wire and the pressure welding tool, the pressing force of the pressure welding tool can be set to a high value so that the contact area between the cover member and the lead wire and the contact area between the lead wire and the land portion increase. As a result, the welding area becomes large and reduction in the connection resistance can be attained.

Further, conductors can be electrically connected surely to each other without using any solder. Accordingly, a bad influence on the environment due to the elements composing the solder can be eliminated. Further, a defect in connection due to a solder splitting phenomenon can be eliminated so that the degree of freedom in design of shape of the land portion is improved greatly.

Further, according to a still further aspect of the present invention, the cover member includes a laminate of a plurality of metal materials having different melting points in which the metal material brought into contact with the lead wire has a melting point lower than a melting point of the metal material brought into contact with the pressure welding tool.

According to the present invention, since a material of a high melting point is disposed on the pressure welding tool side and a material of a low melting point is disposed on the lead wire side, the low melting point material is melted first upon welding and supplied to the connection portion between the lead wire and the land portion. Therefore, the melted material of the cover member plays roles of reinforcing the connection strength, reducing the connection resistance, performing oxidation protection, and so on. On the other hand, since the high melting point material is not melted, separation of the cover member from the pressure welding tool is easy so that the pressure welding tool can be prevented from contamination.

Further, according to the present invention, there is provided a clad material for lead wire connection comprising:

a laminate of a plurality of metal materials having different melting points, wherein the clad material is disposed between a lead wire and a welding tool when the lead wire and a land portion are connected by resistance welding or thermal welding.

According to the present invention, when a clad material constituted by a laminate of a high melting point material disposed on the welding tool side and a low melting point material disposed on the lead wire side is used as the cover member, the low melting point material is melted first upon resistance welding or thermal welding and supplied to the connection portion between the lead wire and the land portion. Therefore, the clad material plays roles of reinforcing the connection strength, reducing the connection resistance, performing oxidation protection, and so on. On the other hand, since the high melting point material is not melted, separation of the cover member from the welding tool is easy so that the welding tool can be prevented from contamination.

BRIEF DESCRIPTION OF THE DRAWINGS

FIG. 2A being a perspective view, FIG. 2B being a front view, FIG. 2C being an exploded sectional view of cover members *52a*, FIG. 2D being an exploded sectional view of a welded portion.

DETAILED DESCRIPTION OF THE PRESENT INVENTION

The present invention will be described with reference to the accompanying drawings.

Figure 1A:
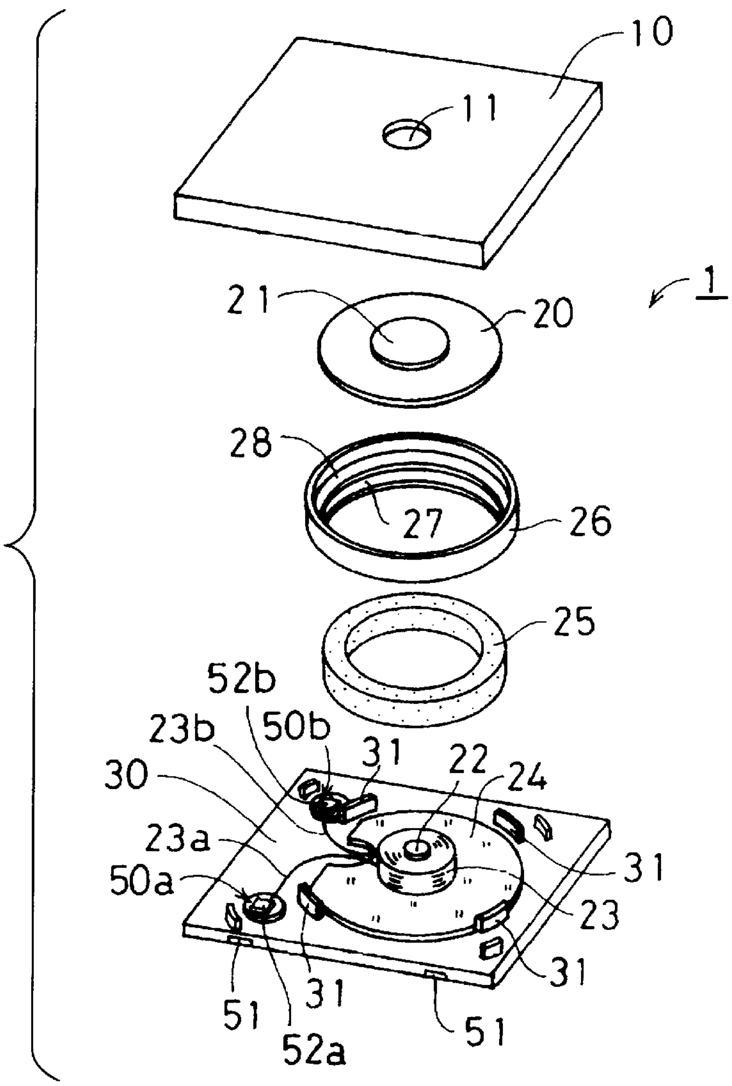
FIG. 1A is an exploded perspective view and FIG. 1B is a sectional side view, both showing an example of an electronic component to which the present invention is applicable.
Figure 1B:
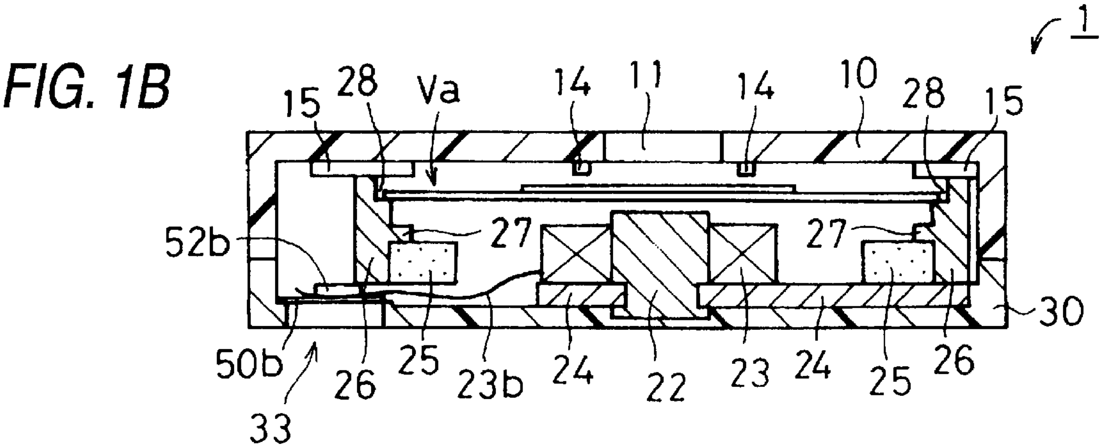

FIGS. 1A and 1B show an example of an electronic component to which the present invention is applicable. FIG. 1A is an exploded perspective view and FIG. 1B is a sectional side view.

An electroacoustic transducer 1 includes a base 24, a magnetic core 22, a coil 23, a magnet 25, a support ring 26, a diaphragm 20, a lower housing 30 and an upper housing 10. The base 24, the magnetic core 22, the coil 23, the magnet 25, the supporting ring 26 and the diaphragm 20 are received on the lower housing 30 and covered with the upper housing 10 so that the electroacoustic transducer 1 is formed to have a rectangular plane shape as a whole. The total size thereof is, for example, about 10 mm wide×12 mm long×2 mm high.

The lower housing 30 is made of synthetic resin such as thermoplastic resin or the like, and includes a plurality of protrusions 31 formed around a circumference of the base 24. The base 24 is formed in a disc shape partially notched to have an approximately D shape, and mounted inside of the protrusions 31 on the lowering housing 30. The magnetic core 22 has a columnar shape, and is erected in the center of the base 24 so that the coil 23 is wound around the magnetic core 22. The base 24 and the magnetic core 22 are made of magnetic materials. Alternatively, the base 24 and the magnetic core 22 may be integrally formed as a single pole piece member by press fitting or the like.

The magnet 25 has an annular shape having an inner diameter smaller than that formed by the protrusions 31. The magnet 25 is disposed on the base 24 so as to be concentric with the magnetic core 22. Accordingly, the annular inner space is ensured between the magnet 25 and the coil 23.

The support ring 26 is made of a non-magnetic material, and has an outer diameter slightly smaller than the inner diameter formed by the protrusions 31 so that the support ring 26 is disposed in contact with the base 24. A plurality of annular steps are formed in the inner side of the support ring 26. Among these steps, a protrusion 27 has a back side to abut against the upper and outer surfaces of the magnet 25 to regulate the position of the magnet 25. Further, a supporting step 28 is formed annularly on above the protrusion 27, so that the diaphragm 20 is mounted on the step 28. Accordingly, the diaphragm 20 is positioned in place.

The diaphragm 20 is made of a magnetic material. The diaphragm 20 is supported by the step 28 of the support ring 26 in the circumferential edge so that a predetermined space is ensured between the back center of the diaphragm 20 and the top end of the magnetic core 22. A disc magnetic piece 21 is fixed to the front center of the diaphragm 20 so that the mass of the diaphragm 20 is increased to thereby improve the oscillation efficiency of air.

The upper housing 10 is made of synthetic resin such as thermoplastic resin or the like. The upper housing 10 is shaped such as a box to be matched with the shape of the lower housing 30. The upper housing 10 and the lower housing 30 are bonded to each other with an adhesive agent, by ultrasonic welding, and so on.

A sound-emitting hole 11 is formed in the ceiling center of the upper housing 10. Protrusions 15 are formed on the inner side of the upper housing 10 to abut against the upper surface of the support ring 26. The protrusions 15 regulate the position of the support ring 26, as shown in FIG. 1B.

In state where the upper housing 10 is mounted, protrusions 14 formed on the ceiling surface of the upper housing 10 are positioned at regular intervals from the magnetic piece 21 of the diaphragm 20. The protrusions 14 prevent the diaphragm 20 from dropping-out or being deformed when a strong shock is given to the transducer. The protrusions 14 have a low height enough not to impede the normal oscillation of the diaphragm 20.

Two plate electrically conductive members are incorporated in the lower housing 30 by insert molding or the like. An end of each of these electrically conductive members is exposed on the corner portion of the upper surface of the lower housing 30 to form a connection land 50*a* (50*b*). The other end is exposed on opposite side surfaces of the lower housing 30, which forms a circuit board connecting terminal 51.

A lead wire 23*a* (23*b*) of the coil 23 passes through the notched portion of the base 24 and is led out to the connection land 50*a* (50*b*). The lead wire 23*a* (23*b*) is disposed on the connection land 50*a* (50*b*). A cover member 52*a* (52*b*) is disposed on the lead wire 23*a* (23*b*). The lead wire 23*a* (23*b*) is held between the cover member 52*a* (52*b*) and the connection land 50*a* (50*b*).

The cover member 52*a* (52*b*) is electrically connected with the lead wire 23*a* (23*b*) by resistance welding or thermal welding. The lead wire 23*a* (23*b*) is electrically connected with the connection land 50*a* (50*b*) by resistance welding or thermal welding.

An opening 33 is formed in a position corresponding to the connection land 50*a* (50*b*) of the lower housing 30. The opening 33 exposes the lower surface of the connection land 50*a* (50*b*) to the outside so as to facilitate accessibility to the connection land 50*a* (50*b*) by a tool, when the lead wire 23*a* (23*b*) and the connection land 50*a* (50*b*) are connected to each other electrically.

Operation will be described below. Referring to FIG. 1B, the magnet 25 is magnetized in the thickness direction. For example, suppose that the bottom surface of the magnet 25 is magnetized to an N pole while the top surface of the magnet 25 is magnetized to an S pole. The lines of magnetic force coming from the bottom surface of the magnet 25 sequentially pass the circumferential edge portion of the base 24, the center portion of the base 24, the magnetic core 22, the center portion of the diaphragm 20, the circumferential edge of the diaphragm 20 and the top surface of the magnet 25. Accordingly, one closed magnetic circuit is formed as a whole. The magnet 25 supplies a static magnetic field to the magnetic circuit to stably support the diaphragm 20 when the diaphragm 20 is attracted toward the side of the magnetic core 22 and the magnet 25.

The coil 23 supplies the oscillation magnetic field to the magnetic circuit, when the coil 23 wound around the magnetic core 22 is supplied with an electric oscillation signal via the terminals 51 and the lead wires 23*a* and 23*b* from the circuit board. Then, the diaphragm 20 oscillates due to superimposition between the static magnetic field and the oscillation magnetic field. Eventually, air on the top surface side of the diaphragm 20 and air on the bottom surface of the diaphragm 20 oscillate.

The front space Va of the diaphragm 20 forms a resonance chamber. Sound at a high sound pressure level is produced when the oscillation frequency of the diaphragm 20 is substantially coincident with the resonance frequency of the resonance chamber. Then, the sound is emitted to the outside from the sound-emitting hole 11 of the upper housing 10. Sound produced on the back side of the diaphragm 20 is confined in the annular inner space because the sound on the back side is an antiphase against the sound on the front side. Hence, interference of the sound on the back side with the sound on the front side can be suppressed as much as possible.

Figure 2A:
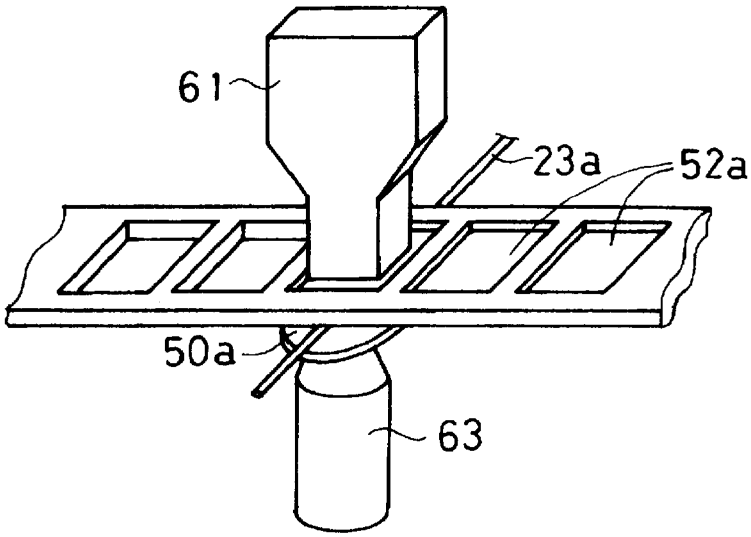
FIGS. 2A to 2D show an example of a method of lead wire connection according to the present invention.
Figure 2B:
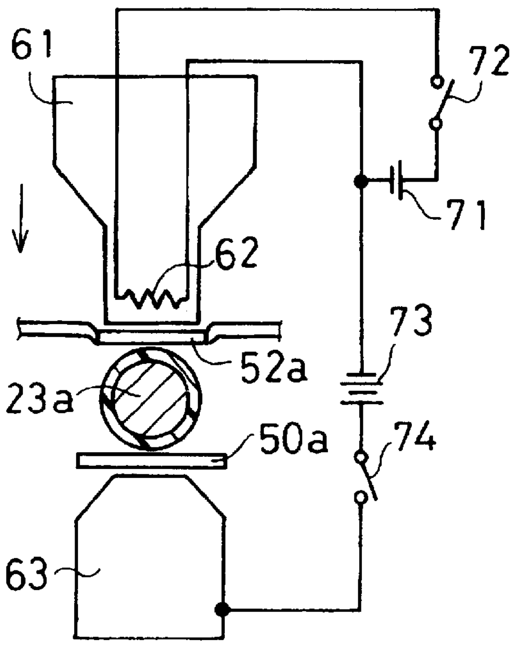
Figure 2C:
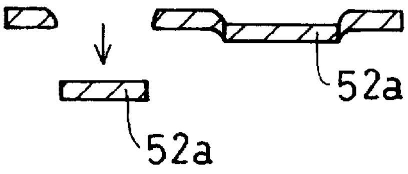
Figure 2D:
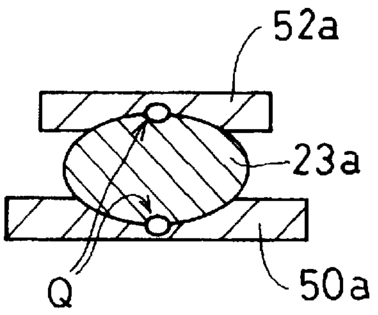

FIGS. 2A to 2D show an example of a method of lead wire connection according to the present invention. FIG. 2A is a perspective view, FIG. 2B is a front view, FIG. 2C is an exploded sectional view of cover members 52*a*, FIG. 2D is an exploded sectional view of a welded portion.

An upper electrode tool 61 is provided with a built-in heater 62, and supported vertically movable in opposition to a lower electrode tool 63. The heater 62 is supplied with heater electric power from a power source 71. A switch 72 turns operation of the heater 62 on/off. Welding electric power is supplied between the electrode tools 61 and 63 from a power source 73. A switch 74 turns the welding operation on/off.

First, the lead wire 23*a* covered with an electrical insulating coating is mounted on the upper surface of the connection land 50*a*. Next, the cover member 52*a* is supplied onto the lead wire 23*a*, and then, the electrode tool 61 is moved down. In such a condition, the lead wire 23*a* is pressed by the electrode tool 61 via the cover member 52*a* against the upper surface of the connection land 50*a* while the lower surface of the connection land 50*a* is supported by the electrode tool 63.

Each of the cover members 52*a* is made of a metal material such as Zn (zinc), Sn (tin) or Ni (nickel). Although the cover members 52*a* may be supplied one by one, the cover members 52*a* may be supplied in the form of a tape of an elongated plate material in which the cover members 52*a* are partially rapped by half-blanking press (push-back), as shown in FIG. 2C, so that manufacturability can be improved.

Next, a switch 72 is closed so that an electric current flows into the heater 62 to heat the electrode tool 61. Thus, the coating of the lead wire 23*a* is broken to thereby make the conductor portion exposed partially.

Next, when the switch 74 is closed so that an electric current is passed between the electrode tool 61 and the electrode tool 63, much Joule heat is generated in the contact portion where electrical resistance is high so that the cover member 52*a* and the lead wire 23*a* are resistance-welded while the lead wire 23*a* and the connection land 50*a* are also resistance-welded. Accordingly, nuggets Q of fused materials are formed, as shown in FIG. 2D. Finally, the switches 72 and 74 are opened and the electrode tool 61 is moved up.

Thus, the conductors can be electrically connected to each other surely without using any solder. The connection process for the lead wire 23*b* and the connection land 50*b* can be also performed in accordance with the above description.

Figure 3A:
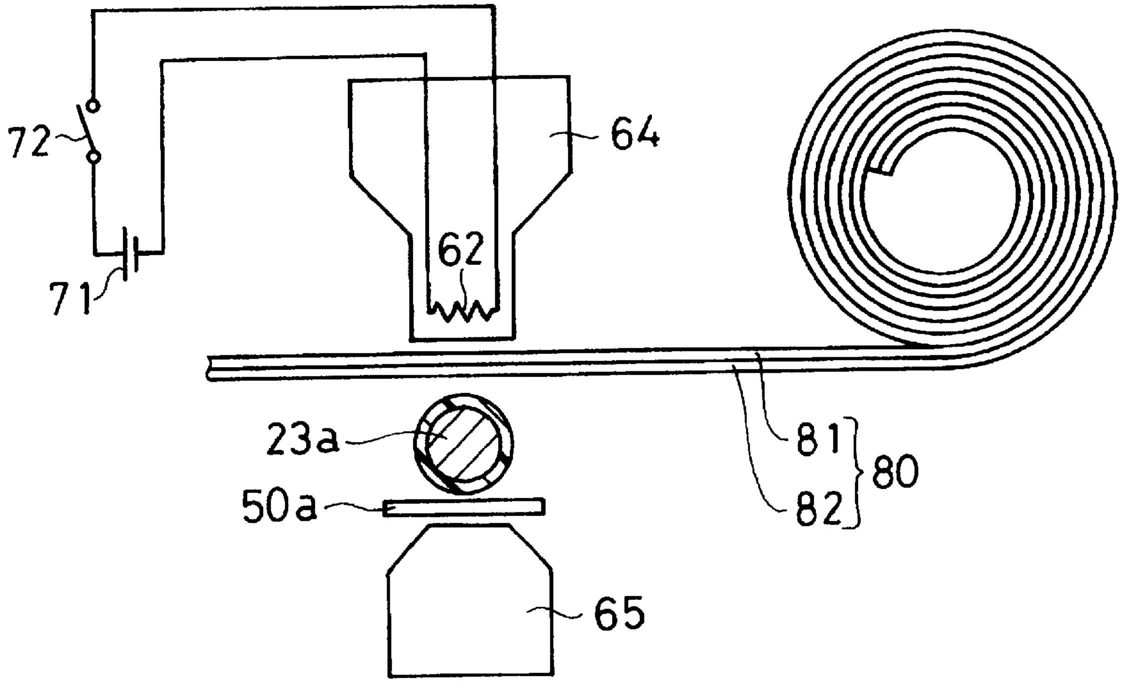
FIGS. 3A and 3B show another example of the method of lead wire connection according to the present invention, FIG. 3A being a front view, FIG. 3B being an exploded sectional view of a connection portion.
Figure 3B:
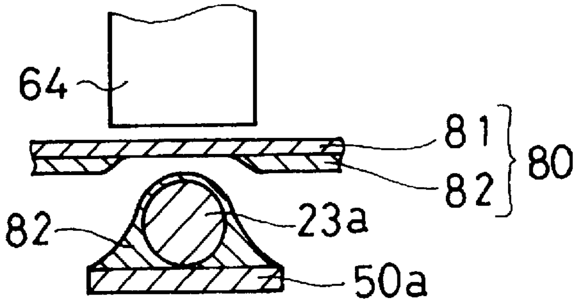

FIGS. 3A and 3B show another example of the method of lead wire connection according to the present invention. FIG. 3A is a front view, and FIG. 3B is an exploded sectional view of the connection portion.

A pressure welding tool 64 provided with the built-in heater 62 is disposed so as to be vertically movable in opposition to a lower support 65. The heater 62 is supplied with a heater electric power from a power source 71, the operation of the heater 62 being turned on/off by a switch 72.

First, the lead wire 23*a* covered with an electrical insulating coating is mounted on the upper surface of the connection land 50*a*. Next, a cover member 80 is supplied onto the lead wire 23*a*, and then, the pressure welding tool 64 is moved down. In such a condition, the lead wire 23*a* is pressed by the pressure welding tool 64 via the cover member 80 against the upper surface of the connection lead 50*a* while the lower surface of the connection land 50*a* is supported by the support1 65.

The cover member 80 is constituted by a laminate of a plurality of metal materials 81 and 82 which are different from each other in melting point. The high melting point material 81 is formed of a metal material such as Ni (nickel, melting point: 1,400° C.) or the like. The low melting point material 82 is formed of a metal material such as Sn (tin, melting point: 630° C.) or the like so that the melting point of the low melting point material 82 is set to be lower than the melting point (700° C.–800° C.) of Cu or phosphor bronze forming the lead wire 23*a* or the connection land 50*a*. As the cover member 80, a clad material constituted by a laminate of a plurality of metal materials may be used, so that the cover members 80 may be provided, for example, in the form of a tape from a roll to thereby improve the manufacturability.

Further, when the high melting point material 81 is disposed on the pressure welding tool 64 side, the cover member 80 is easily separated from the pressure welding tool 64 so that the pressure welding tool 64 can be prevented from contamination.

Next, the switch 72 is closed so that an electric current flows into the heater 62 to heat the pressure welding tool 64. Thus, the coating of the lead wire 23*a* is broken to thereby make the conductor portion exposed partially.

Further, when the current capacity of the heater 62 is increased and the temperature of the pressure welding tool 64 is raised, the low melting point material 82 located on the lead wire side of the cover material 80 is partially melted, and supplied to the connection portion between the lead wire 23*a* and the connection land 50*a*, as shown in FIG. 3B. Accordingly, the low melting point material 82 functions as reinforcing the connection strength, reducing the connection resistance, performing oxidation protection, and so on. Finally, the switch 72 is opened so that the pressure welding tool 64 is moved up.

In such a manner, the conductors can be electrically connected to each other surely without using any solder. The connection process for the lead wire 23*b* and the connection land 50*b* can be also performed in accordance with the above description.

Figure 4:
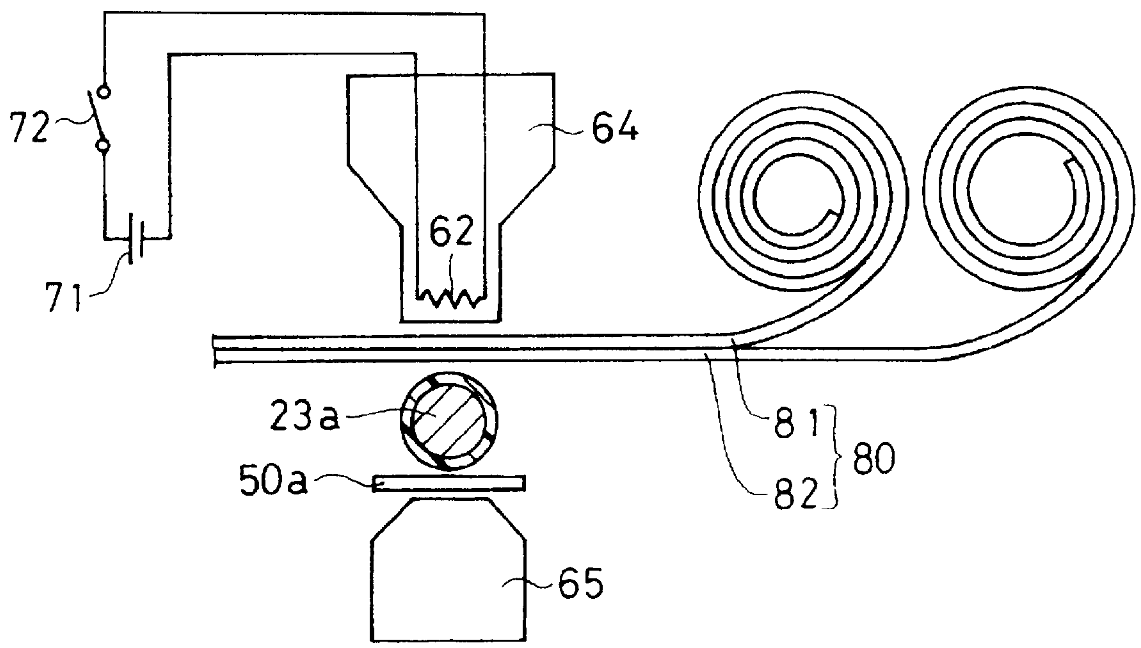
FIG. 4 is a front view showing a further example of the method of lead wire connection according to the present invention.

FIG. 4 is a front view showing a further example of the method of lead wire connection according to the present invention. Here, the cover member 80 is supplied in the form that a high melting point material 81 and a low melting point material 82 are prepared in separate rolls and laminated on each other in the stage of the connection process.

As described above in detail, according to the present invention, when the cover member is disposed on the lead wire, the tool does not come into direct contact with the lead wire so that damage or disconnection of the lead wire can be prevented.

Further, with interposition of the cover member, the pressing force of the tool can be set to a high value so that the contact area is enlarged and reduction in the connection resistance can be attained.

Further, conductors can be electrically connected to each other surely without using any solder so that a bad influence on the environment due to the elements composing the solder can be eliminated.

Further, a defect in connection due to the solder splitting phenomenon can be eliminated so that the degree of freedom in design of the shape of the land portion is improved greatly.

What is claimed is:

1. A method of lead wire connection comprising:

mounting a lead wire covered with an electrical insulating coating onto an upper surface of a land portion;

supplying a cover member onto the lead wire, the cover member made of a metal material and separately formed from the lead wire and the land portion;

pressing the lead wire via the cover member against the upper surface of the land portion by a first electrode tool having a heater mechanism while supporting a lower surface of the land portion by a second electrode tool;

heating the first electrode tool by the heater mechanism to make the lead wire exposed partially; and applying an electric current between the first and second electrode tools so that resistance welding is effected between the cover member and the lead wire and between the lead wire and the land portion, simultaneously.

2. A method of lead wire connection comprising:

mounting a lead wire covered with an electrical insulating coating onto an upper surface of a land portion;

supplying a cover member onto the lead wire, the cover member formed separately from the lead wire and the land portion;

pressing the lead wire via the cover member against the upper surface of the land portion by a pressure welding tool having a heater mechanism;

heating the pressure welding tool by the heater mechanism at a first temperature to make the lead wire exposed partially; and heating the pressure welding tool by the heater mechanism at a second temperature higher than the first temperature to supply a melted portion of the cover member around the lead wire and the land portion.

3. The method of lead wire connection according to claim 2, wherein the cover member comprises a laminate of a plurality of metal materials having different melting points; and the metal material brought into contact with the lead wire has a melting point lower than a melting point of the metal material brought into contact with the pressure welding tool.

4. A method of lead wire connection comprising:

mounting a lead wire covered with an electrical insulating coating onto an upper surface of a land portion;

heating the electrical insulating coating at a first temperature by a pressure welding tool having a heater mechanism to melt the electrical insulating coating on the upper surface of the land portion;

supplying a cover member onto the lead wire on the upper surface of the land portion, the cover member formed separately from the lead wire and the land portion; and heating a portion of the cover member by the heater mechanism at a second temperature higher than the first temperature and lower than the melting point of the land portion to melt the portion to supply the melted portion around the lead wire and the land portion.

5. A method of lead wire connection comprising:

mounting a lead wire covered with an electrical insulating coating onto an upper surface of a land portion;

supplying a cover member onto the lead wire on the upper surface of the land portion, the cover member formed separately from the lead wire and the land portion;

pressing the lead wire via the cover member against the upper surface of the land portion by a pressure welding tool having a heater mechanism;

bringing a non-melting portion of the cover member in contact with the pressure welding tool;

supplying a melting portion of the cover member onto the lead wire on the upper surface of the land portion; and heating a portion of the cover member by the heater mechanism at a predetermined temperature to melt and supply the melting portion around the lead wire and the land portion.

* * * * *